United States Patent
Mooren et al.

(10) Patent No.: US 12,213,491 B2
(45) Date of Patent: Feb. 4, 2025

(54) SYSTEM AND METHOD FOR PROCESSING A BACKHALVE OF A SLAUGHTERED POULTRY CARCASS

(71) Applicant: Marel Poultry B.V., Av Boxmeer (NL)

(72) Inventors: Mike Christiaan Maria Mooren, Av Boxmeer (NL); Laurens Christian Philippo, Av Boxmeer (NL); Marinus Petrus Johannes Thijssen, Av Boxmeer (NL); Maurice Eduardus Theodorus Van Esbroeck, Av Boxmeer (NL)

(73) Assignee: Marel Poultry B.V., Av Boxmeer (NL)

(*) Notice: Subject to any disclaimer, the term of this patent is extended or adjusted under 35 U.S.C. 154(b) by 58 days.

(21) Appl. No.: 18/266,459

(22) PCT Filed: Dec. 10, 2021

(86) PCT No.: PCT/NL2021/050755
§ 371 (c)(1),
(2) Date: Jun. 9, 2023

(87) PCT Pub. No.: WO2022/131909
PCT Pub. Date: Jun. 23, 2022

(65) Prior Publication Data
US 2024/0041057 A1    Feb. 8, 2024

(30) Foreign Application Priority Data
Dec. 18, 2020    (NL) ...................................... 2027154

(51) Int. Cl.
*A22C 21/00*    (2006.01)
*B65G 17/48*    (2006.01)

(52) U.S. Cl.
CPC ...... *A22C 21/0023* (2013.01); *A22C 21/0053* (2013.01); *B65G 17/485* (2013.01); *B65G 2201/0202* (2013.01)

(58) Field of Classification Search
CPC ............ A22C 21/0023; A22C 21/0053; B65G 17/485; B65G 2201/0202
(Continued)

(56) References Cited

U.S. PATENT DOCUMENTS 5,194,035 A * 3/1993 Dillard ............... A22C 21/0046
452/160
5,429,549 A * 7/1995 Verrijp ............... A22C 21/0023
452/167

(Continued)

FOREIGN PATENT DOCUMENTS

EP    0164167 A1    12/1985
EP    2550866 A1    1/2013
(Continued)

OTHER PUBLICATIONS

International Search Report and Written Opinion in corresponding International Application No. PCT/NL2021/050755, dated Feb. 24, 2022 (10 pages).
(Continued)

*Primary Examiner* — Richard T Price, Jr.
(74) *Attorney, Agent, or Firm* — Osha Bergman Watanabe & Burton

(57) ABSTRACT

A system and method are provided for processing a backhalve of a slaughtered poultry carcass, comprising a back portion and legs, and transported by a conveyor in a suspended manner. The system comprises a back turning device, having a stationary frame and a receiving element movably connected to the frame and configured to receive at least a part of the back portion and configured to be moved (Continued)

Figure 1:
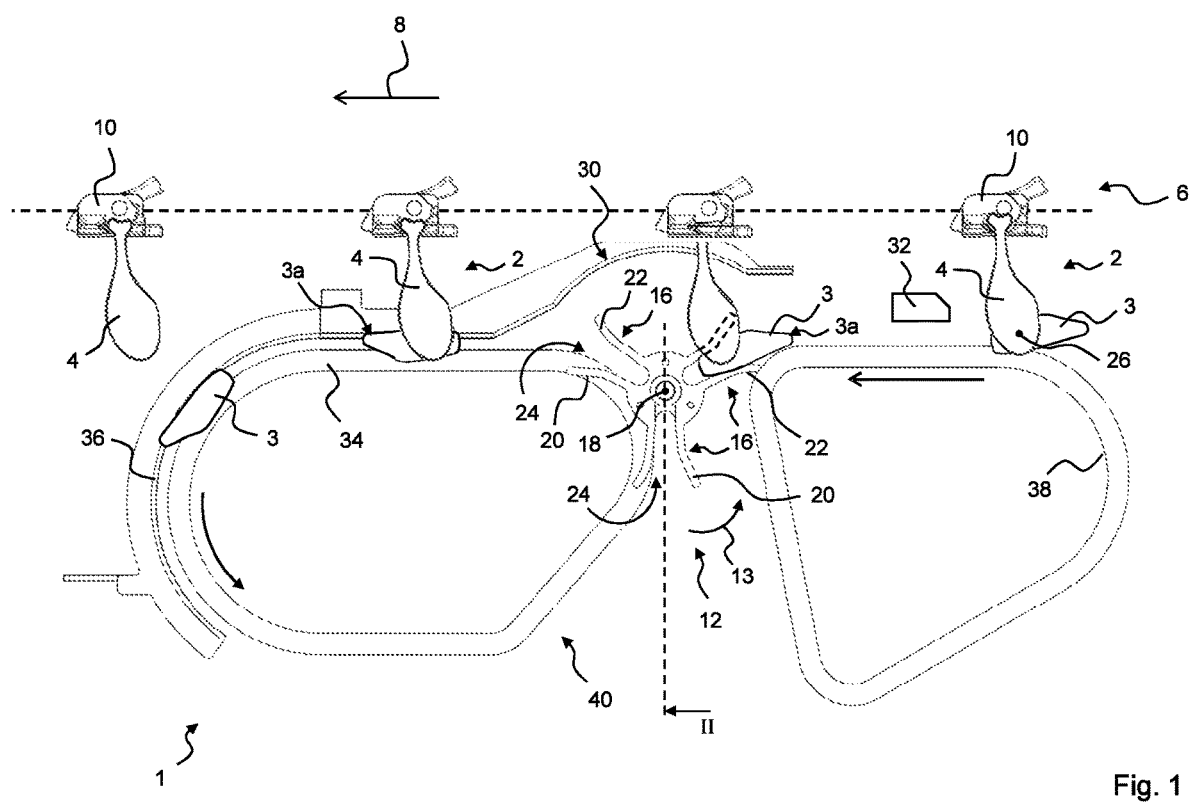

in the conveying direction with at least said part of the back portion received in the receiving element during continued movement of the backhalve so as to turn the back portion upside-down; and a separation device for separating the legs from the back portion with the back portion in said upside-down orientation.

18 Claims, 2 Drawing Sheets

(58) Field of Classification Search
USPC .......................................................... 452/149
See application file for complete search history.

(56) References Cited

U.S. PATENT DOCUMENTS

| | | | | |
|---|---|---|---|---|
| 5,954,574 A | * | 9/1999 | Verrijp | ............... A22C 21/0023 452/169 |
| 6,322,438 B1 | * | 11/2001 | Barendregt | ........ A22C 21/0023 452/155 |

FOREIGN PATENT DOCUMENTS

| | | | |
|---|---|---|---|
| EP | 2656736 A1 | 10/2013 | |
| WO | 9305660 A1 | 4/1993 | |

OTHER PUBLICATIONS

Netherlands Search Report in corresponding Nertherland Application No. 2027154, dated Dec. 18, 2020 (9 pages).

* cited by examiner

SYSTEM AND METHOD FOR PROCESSING A BACKHALVE OF A SLAUGHTERED POULTRY CARCASS

The present invention relates to a system and a method for processing a backhalve of a slaughtered poultry carcass. A backhalve is a part of a slaughtered poultry carcass comprising a back portion and legs connected thereto.

WO 93/05660 A1 relates to a method and apparatus for separating the legs from the back of a poultry carcass. The apparatus has an upstanding crooked bar positioned to engage and arrest the forward movement of the leading edge of a carcass back portion as the carcass moves along the processing path. As a consequence, the legs tend to pull the trailing edge of the back up and over the arrested leading edge causing the back to rotate. After that, the back is separated from the legs.

U.S. Pat. No. 6,322,438 B1 has a similar construction as the apparatus of WO 93/05660 A1 and discloses an apparatus including a pair of deflector bars. During its movement while being suspended from a shackle, the forward portion of the back of the carcass will engage the deflector bars so as to rotate in a forward direction, bringing the tail over the back portion. Then, the legs are cut away from the back.

A problem of the above cited apparatus is that a product quality of in particular the legs may be improved. A problem of the above cited apparatus is that leg meat may be damaged during the processing. Also, the yield of the legs may be improved.

It is an object of the invention to provide an improved system and method for processing a backhalve, in which one or more of the above disadvantages are resolved or at least alleviated. It is another object of the invention to provide a system and method for processing a backhalve, in which damage to the leg meat is reduced. It is still another object of the invention to provide a system and method for processing a backhalve, in which yield of the legs is increased.

One or more of the above objects are achieved by the system and method according to the invention. In a first aspect of the invention a system is provided, for processing a backhalve of a slaughtered poultry carcass, the backhalve comprising a back portion and legs connected thereto and which backhalve is transported by a conveyor in a suspended manner in a conveying direction with the legs hanging from the conveyor in use of the system, the system comprising:
  a back turning device, having a stationary frame and a receiving element which is movably connected to the frame, wherein the receiving element is configured to receive therein at least a part of the back portion and is further configured to be moved in the conveying direction with at least said part of the back portion received in the receiving element during continued movement of the backhalve in the conveying direction during use, so as to turn the back portion upside-down as a result of said movement of the receiving element; and
  a separation device, provided downstream of the back turning device in the conveying direction, and configured for separating the legs from the back portion with the back portion in said upside-down orientation.

An effect of the provision of the back turning device is that the turning upside-down of the back portion is carried out in a more controlled manner. Tension on leg meat, or at least pulling forces on the legs, during the turning of the back portion are decreased, which leads to a reduced meat damage of the leg and thereby to a higher quality of the legs. Another effect is that the amount of meat, originating from the hip area, ending up on the legs after separation, may be higher. This increases the yield of the legs.

This in contrast to the above mentioned prior art apparatus and methods, in which the turning of the back portion results in significant pulling forces being exerted on the legs and muscles thereof during the turning process, which is undesired because it causes damage to the leg meat.

With the system and method according to the invention, the back portion may thus be turned upside-down by applying forces directly on the back portion while the legs may remain free, or at least to a substantially larger extent free, of tensile, or, pulling forces resulting from the turning of the back portion.

In an embodiment, the receiving element is configured to hold a back portion therein by engaging the back portion at least at an outer (i.e. skin) side and at an opposite inner side of the back portion.

In an embodiment, the receiving element has at least two elongate extension elements defining a receiving space there between for receiving at least the part of the back portion of the backhalve in the receiving space. Each elongate extension element may in an embodiment have one or more, preferably two, parallel fingers defining a width, preferably such that the receiving element may receive a back portion with at least a quarter of the width thereof in the receiving space. Alternatively each elongate extension element may be a single part, defining said width.

In an embodiment, the receiving element may be funnel-shaped at a free end thereof, enabling a more easy and reliable entrance of the back portion in the receiving space. For this purpose, the system may have a supply conveyor upstream of the back turning device, the supply conveyor supporting the back portion of the backhalve thereon during the conveying thereof by the conveyor towards the back turning device.

During the turning of the back portion, the receiving element may be configured to move from an upstream position in which the back portion enters the receiving element, such as connecting to the supply conveyor such that the back portion is guided by the supply conveyor to the receiving element, to a downstream position in which the back portion, turned upside-down, leaves the receiving element and is further conveyed by the conveyor.

In an embodiment, the receiving element is configured to lift the back portion during said movement of the receiving element in the conveying direction. lifting the back portion during said movement and thus during the turning of the back portion upside-down leads to a slight loosening of the suspension of the legs from the conveyor. The turning upside-down in that case results in even further reduced or even absence of pulling forces on the legs. The lifting of the back portion consequently also results in a lifting of the hip joints, and more freedom of movement of any meat near the hip joints. Said lifting during the movement of the receiving element thus further contributes to a reduced meat damage of the leg and thereby to a higher quality of the legs.

In an embodiment, said movement of the receiving element in the conveying direction comprises at least a rotation movement, so as to turn the back portion upside-down as a result of said rotation movement. A rotation movement is a very convenient movement for turning the back portion upside-down. A rotation movement in a vertical plane is very suitable for providing said lifting during the rotation movement in case that an upper arc part is used for the rotation movement.

In an embodiment, the receiving element is rotatably connected to the frame about a rotation axis which rotation axis preferably extends transverse to the conveying direction. In an embodiment, said movement of the receiving element in the conveying direction comprises a rotation in a vertical plane about the rotation axis. An angle of rotation used for the turning upside-down may be in the range of 90 to 180 degrees, preferably between 100 and 150 degrees. In an embodiment the poultry carcass moves at a level higher than the rotation axis past the back turning device during use, so that an upper arc part of said rotation of the receiving element is used for the turning of the back portion. The back turning device may be arranged to fully rotate the receiving element during use. That means, the receiving element may make full rotations about the rotation axis during use, wherein a part of said full rotation is used for the turning of the back. Alternatively, the back turning device may be arranged to rotate the receiving element forward and backward, such as over a mentioned angle in the range of 100 and 150 degrees, between an upstream and downstream position for the purpose of turning the back portion. Such a forward and backward rotation over a certain angle may also be referred to as a forward and backward pivoting movement.

Alternatively, the movement may comprise a translation movement as well as a rotation movement, such as in a paternoster-like manner, and/or may comprise a rotation movement about a rotation axis extending in the conveying direction, for example.

In an embodiment, the back turning device has multiple of said receiving elements. In the embodiment wherein the receiving element is rotatably connected to the frame about a rotation axis which rotation axis preferably transverse to the conveying direction, each of said multiple of said receiving elements may be rotatable about the rotation axis.

In an embodiment, the multiple receiving elements are two, three or four, preferably three, receiving elements, each fixated to and extending radially from a central base part defining the rotation axis. The multiple receiving elements are preferably regularly spaced apart on the base part. That means, in case of three such element, they may be spaced apart at 120 degrees on the base part. The provision of such a multiple of receiving elements may enable the increase of a conveying speed, and makes the operation of the back turning device more easy. The central base part may comprise a bearing element.

In an embodiment, the receiving element is configured to move in the conveying direction with the back portion received in the receiving element such that an upstream end of the back portion is moved in the conveying direction between and past the legs, or at least hip joints thereof.

In an embodiment, the back turning device has a drive unit operatively connected to the receiving element for moving the receiving element in the conveying direction. The drive unit may be an electromotor connected to a rotation shaft for providing the rotation movement, or it may comprise a cam-follower or a pneumatic actuator, for example. The drive unit may be configured to move the receiving element at a constant speed, for example. The drive unit may alternatively be configured to adapt a speed of movement of the receiving element during use, such as based on feedback signals which may be a current, force-related or position related signal. The drive unit may be configured to adapt a timing of movement of the receiving element during use, such as a timing of movement dependent on the movement in the conveying direction of the conveyor. The drive unit may be configured for providing a mentioned pivoting movement, forward and backward in the conveying direction in case of an embodiment of the back turning device having a single receiving element.

In an embodiment, the system further comprises a stationary guide for keeping at least the part of the back portion of the backhalve in the receiving element during the turning of the back portion by the back turning device. This increases the reliability of the turning operation.

In an embodiment, the system further comprises a cutting device upstream of the back turning device, for cutting connections, which may include tendons and/or cartilage, at or at least near the hip joints. This makes it easier to turn the back portion upside-down afterwards.

In an embodiment, the separation device comprises a separation conveyor supporting the back portion in its upside-down orientation downstream of the back turning device. The separation conveyor, for the purpose of separating the legs from the back portion, may be configured to be moved at a speed different than that of the conveyor, so that the back portion will be pulled away from the legs, and/or may be configured to be moved away from the conveyor, also resulting in the pulling away of the back portion from the legs. Alternatively or in addition, the system may comprise a leg cutting device along the separation conveyor, for cutting off the back portion off the legs. A further stationary guide may extend along and above the separating conveyor to assist in maintaining the back portion upside-down during the conveying by the separation conveyor. Said further guide may further assist in pulling the back portion off the legs during a movement of the separation conveyor, that means of a conveying path thereof, away from the conveyor.

Corresponding embodiments are also applicable for the below described method according to the second aspect of the present invention. The system according to the first aspect of the present invention may be arranged for carrying out the method according to a second aspect of the invention.

In a second aspect, the invention provides a method of processing a backhalve of a slaughtered poultry carcass, the backhalve comprising a back portion and legs connected thereto, the method comprising:
  transporting the backhalve in a suspended manner by a conveyor in a conveying direction, with the legs hanging from the conveyor;
  receiving at least a part of the back portion in a receiving element of a back turning device, which receiving element is movably connected to a stationary frame of the back turning device;
  turning the back portion upside-down while at least said part of the back portion is received in the receiving element, by moving the receiving element in the conveying direction during continued movement of the backhalve in the conveying direction; and
  separating the legs from the back portion with the back portion in said upside-down orientation.

In an embodiment, the system according to the first aspect is used in a method according to the second aspect.

In an embodiment, for the purpose of the step of turning, the back portion is lifted during the moving of the receiving element in the conveying direction, and is thus lifted during the turning of the back portion.

In an embodiment, said movement of the receiving element in the conveying direction comprises at least a rotation movement, so as to turn the back portion upside-down as a result of said rotation movement.

In an embodiment, the receiving element is rotatably connected to the frame about a rotation axis transverse to the conveying direction and wherein for the purpose of turning the back portion upside-down, the receiving element is rotated in a vertical plane about the rotation axis.

In an embodiment, during the moving of the receiving element in the conveying direction with at least said part of the back portion received in the receiving element, an upstream end of the back portion is moved in the conveying direction between and past the legs, or at least hip joints thereof.

Corresponding embodiments are also applicable for the above described system according to the first aspect of the present invention. Effects of the method according to the present invention are analogue to the effects of the system according to the invention as described above.

In general terms the present invention relates to a system and method for processing a backhalve of a slaughtered poultry carcass, comprising a back portion and legs, and transported by a conveyor in a suspended manner. The system comprises a back turning device, having a stationary frame and a receiving element movably connected to the frame and configured to receive at least a part of the back portion and configured to move in the conveying direction with at least said part of the back portion received in the receiving element during continued movement of the backhalve so as to turn the back portion upside-down; and a separation device for separating the legs from the back portion with the back portion in said upside down orientation.

The present invention is described hereinafter with reference to the accompanying schematic drawings in which embodiments of the present invention are shown and in which like reference numbers indicate the same or similar elements.

Figure 2:
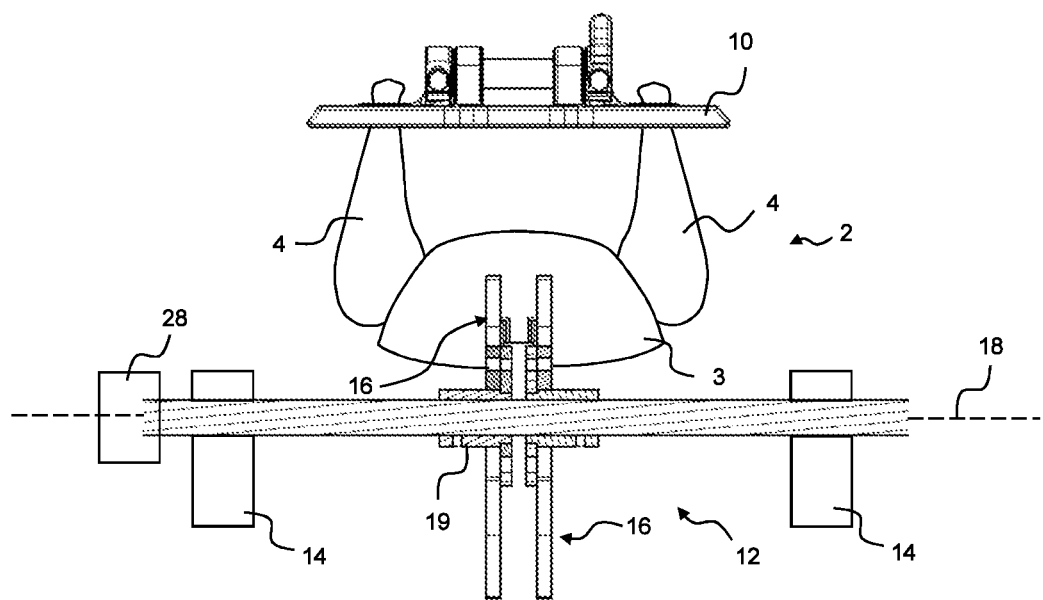

FIG. 1 shows, in front view, an embodiment of a system for processing a backhalve of a slaughtered poultry carcass in accordance with the present invention; and FIG. 2 shows section II-II according to FIG. 1.

FIG. 1 shows a system 1 for processing a backhalve 2 of a slaughtered poultry carcass. The backhalve 2 comprises a back portion 3 and legs 4 connected thereto. During use, backhalves 2 are successively transported by a conveyor 6 in a suspended manner in a conveying direction 8 with the legs 4 hanging from the conveyor 6, more specifically, each hanging from a carrier 10 of the conveyor 6.

The system 1 comprises a back turning device 12, having a stationary frame 14 (highly schematic displayed in FIG. 2) and a receiving element 16 which is movably connected to the frame 14. Said movement of the receiving element 16 in the conveying direction 8 comprises at least a rotation movement, so as to turn the back portion 3 upside-down as a result of said rotation movement. More specifically, in the present example the back turning device 12 has three such receiving elements 16 each rotatably connected to the frame 14 about a rotation axis 18 transverse to the conveying direction 8 and wherein said movement of the receiving elements 16 in the conveying direction comprises a rotation in a vertical plane about the rotation axis 18. The three receiving elements 16 are each fixated to and extending radially from a central base part 19 defining the rotation axis 18 with a central axis thereof. The three receiving elements 16 are spaced apart at 120 degrees with respect to the rotation axis 18, as FIG. 1 shows. During use, the backhalves 2 move at a level higher than the rotation axis 18 past the back turning device 12. This means that on an upper arc part of the rotation of the receiving elements, they may receive back portions 3 and move in the conveying direction from an upstream to a downstream position. During the rotation of the receiving elements 16 and as an effect of the receiving elements moving through an arc part, the back portions 3 will temporarily be lifted by the receiving elements. This leads to a slight loosening of the suspension of the legs from the conveyor 6 resulting in even further reduced or even absence of pulling forces on the legs 4. As shown, when one receiving element is in the upstream position, another receiving element is in the downstream position. Thus, when one back portion enters the receiving space of the first mentioned receiving element, the upside-down back portion of a directly downstream backhalve may leave the last mentioned receiving element. A lower arc part, i.e. below axis 18, is used for rotating the receiving elements against the conveying direction, that means back from the downstream to the upstream position.

Each of the receiving elements 16 is configured to receive therein at least a part of the back portion 3 of the backhalve 2 and is further configured to move in the conveying direction 8 with at least said part of the back portion received in the receiving element 16 during continued movement of the backhalve 2 in the conveying direction 8 during use, so as to turn the back portion 3 upside-down as a result of said movement of the receiving element 16. For this purpose, the receiving element 16 has two elongate extension elements 20, 22 defining a receiving space 24 there between for receiving at least the part of the back portion 3 of the backhalve in the receiving space 24. As FIGS. 1 and 2 in combination show, each extension element 20 or 22 has two fingers positioned besides each other, i.e. in a transverse direction. Or, formulated in another manner, two pairs of elongate extension elements may be provided defining a receiving space between the pairs. As FIG. 1 shows, a larger part of one back portion 3 has just been received in the receiving space 24 and has thereby been caught by the receiving element, which can be considered to be in an upstream position. This means that the orientation of the back portion 3 with respect to the receiving element 16 is at least substantially fixed during its presence in the receiving element 16.

The back turning device 12 has a drive unit 28 operatively connected to the receiving elements 16 for moving the receiving elements 16 in the conveying direction, i.e. for rotating the receiving elements 16 about the axis 18 in a rotation direction 13. The axis 18 is the central axis of a drive shaft coupled to the drive unit 28. As a result of the rotation of the receiving elements 16, they can each time receive a back portion 3 which is supplied to the back turning device by the conveyor 6, move along with the backhalve 2 as a result of its rotation in direction 13, thereby turning the back portion 3 upside-down while temporarily lifting it, after which the back portion leaves the receiving element again as a result of its continued movement in the conveying direction 8. In FIG. 1, one backhalve 2 is displayed just left of the back turning device 12, of which the back portion 3 has been turned upside-down. The receiving elements 16 are each configured to move in the conveying direction 8 with a back portion 3 received in the receiving element 16 such that an upstream end 3a of the back portion 3 is moved in the conveying direction 8 between and past the legs 4, or at least hip joints 26 thereof.

The system further comprises a guide 30 for keeping at least the part of the back portion 3 of the poultry carcass 2 in the receiving element 16 during the turning of the back portion 3 by the back turning device 12. This means that by the guide 30 it is effectively prevented that a back portion 3 may for whatever reason prematurely leave the receiving element. The system 1 also comprises a cutting device 32 (displayed highly schematic) provided upstream of the back turning device 12, for cutting connections which may include tendons and/or cartilage at or at least near the hip joints 26. The cutting device 32 is provided just above a supply conveyor 38.

During the conveying away from the back turning device 12, the back portions 3 in said upside down orientation are supported by a separation conveyor 34 of a separation device 40, provided downstream of the back turning device 12 in the conveying direction 8. As FIG. 1 shows, the conveyor 34 bends downwards while the conveyor 6 continues its horizontal movement. In addition the conveyor 34 may have a lower or higher speed than that of the conveyor 6. A path of the conveyor 34 is followed by a guide 36, catching the back portions 3 between the conveyor 34 and the guide and thereby separating the legs 4 from the back portions 3 with the back portions 3 in said upside down orientation. This is shown for the left-most backhalve 2, or at least the legs 4 and the separated back portion 3 of a backhalve 2. So, the separation conveyor 34, for the purpose of separating the legs 4 from the back portion 3, is configured to be moved away from the conveyor 6.

As will already be clear from the above description of an embodiment of a system according to the invention, a method of processing a backhalve of a slaughtered poultry carcass, using such a system 1, comprises:

transporting the backhalve 2 in a suspended manner by the conveyor 6 in a conveying direction 8, with the legs 4 hanging from the conveyor 6;

receiving at least a part of the back portion 3 in a receiving element 16 of the back turning device 12, which receiving element 16 is movably connected to a stationary frame 14 of the back turning device 12;

turning the back portion 3 upside-down while at least said part of the back portion 3 is received in the receiving element 16, by moving the receiving element 16 in the conveying direction 8 during continued movement of the poultry carcass in the conveying direction 8, which moving comprises a rotation movement; and separating the legs 4 from the back portion 3 with the back portion 3 in said upside down orientation.

For the purpose of the step of turning, the back portion 3 may be lifted during the moving of the receiving element 16 in the conveying direction 8.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A system for processing a backhalve of a slaughtered poultry carcass, the backhalve comprising a back portion and legs connected thereto and which backhalve is transported by a conveyor in a suspended manner in a conveying direction with the legs hanging from the conveyor in use of the system, the system comprising:

a back turning device, having a stationary frame and a receiving element which is movably connected to the frame, wherein the receiving element is configured to receive therein at least a part of the back portion and is further configured to be moved in the conveying direction with at least said part of the back portion received in the receiving element during continued movement of the backhalve in the conveying direction during use, so as to turn the back portion upside-down as a result of said movement of the receiving element; and a separation device, provided downstream of the back turning device in the conveying direction, and configured for separating the legs from the back portion with the back portion in said upside down orientation.

2. The system according to claim 1, wherein the receiving element has at least two elongate extension elements defining a receiving space there between for receiving at least the part of the back portion of the backhalve in the receiving space.

3. The system according to claim 1, wherein the receiving element is configured to lift the back portion during said movement of the receiving element in the conveying direction.

4. The system according to claim 1, wherein said movement of the receiving element in the conveying direction comprises at least a rotation movement, so as to turn the back portion upside-down as a result of said rotation movement.

5. The system according to claim 4, wherein the receiving element is rotatably connected to the frame about a rotation axis transverse to the conveying direction, and wherein said movement of the receiving element in the conveying direction comprises a rotation in a vertical plane about the rotation axis.

6. The system according to claim 5, wherein the back turning device has multiple of said receiving elements, each rotatable about the rotation axis.

7. The system according to claim 6, wherein the multiple receiving elements comprise three receiving elements, each fixated to and extending radially from a central base part defining the rotation axis.

8. The system according claim 1, wherein the receiving element is configured to move in the conveying direction with the back portion received in the receiving element such that an upstream end of the back portion is moved in the conveying direction between and past the legs, or at least hip joints thereof.

9. The system according to claim 1, wherein the back turning device has a drive unit operatively connected to the receiving element for moving the receiving element in the conveying direction.

10. The system according to claim 1, further comprising a stationary guide for keeping at least the part of the back portion of the backhalve in the receiving element during the turning of the back portion by the back turning device.

11. The system according to claim 1, further comprising a cutting device upstream of the back turning device, for cutting connections at or at least near the hip joints.

12. The system according to claim 1, wherein the separation device comprises a separation conveyor supporting the back portion in its upside-down orientation downstream of the back turning device, wherein the separation conveyor, for the purpose of separating the legs from the back portion, is configured to be moved at a speed different than that of the conveyor, and/or is configured to be moved away from the conveyor, and/or wherein the system comprises a leg cutting device along the separation conveyor.

13. A method of processing a backhalve of a slaughtered poultry carcass, the backhalve comprising a back portion and legs connected thereto, the method comprising:

transporting the backhalve in a suspended manner by a conveyor in a conveying direction, with the legs hanging from the conveyor;

receiving at least a part of the back portion in a receiving element of a back turning device, which receiving element is movably connected to a stationary frame of the back turning device;

turning the back portion upside-down while at least said part of the back portion is received in the receiving element, by moving the receiving element in the conveying direction during continued movement of the backhalve in the conveying direction; and separating the legs from the back portion with the back portion in said upside down orientation.

14. The method of claim 13, in which a system according to claim 1 is used.

15. The method according to claim 13, wherein for the purpose of the step of turning, the back portion is lifted during the moving of the receiving element in the conveying direction.

16. The method according to claim 13, wherein said movement of the receiving element in the conveying direction comprises at least a rotation movement, so as to turn the back portion upside-down as a result of said rotation movement.

17. The method according to claim 16, wherein the receiving element is rotatably connected to the frame about a rotation axis transverse to the conveying direction and wherein for the purpose of turning the back portion upside-down, the receiving element is rotated in a vertical plane about the rotation axis.

18. The method according to claim 13, wherein during the moving of the receiving element in the conveying direction with at least said part of the back portion received in the receiving element, an upstream end of the back portion is moved in the conveying direction between and past the legs, or at least hip joints thereof.

* * * * *